United States Patent
Ledoux et al.

(10) Patent No.: US 8,524,165 B2
(45) Date of Patent: Sep. 3, 2013

(54) PIPE REACTOR AND PLANT FOR MANUFACTURING OF ESPECIALLY UREA AMMONIUM SULPHATE

(75) Inventors: Francois Ledoux, Osny (FR); Vincent Duponchel, Bondues (FR); Edmond Vogel, Vaucresson (FR)

(73) Assignee: Yara International ASA, Oslo (NO)

( * ) Notice: Subject to any disclaimer, the term of this patent is extended or adjusted under 35 U.S.C. 154(b) by 1370 days.

(21) Appl. No.: 11/884,008

(22) PCT Filed: Mar. 2, 2005

(86) PCT No.: PCT/NO2005/000076
§ 371 (c)(1),
(2), (4) Date: Dec. 13, 2007

(87) PCT Pub. No.: WO2006/093413
PCT Pub. Date: Sep. 8, 2006

(65) Prior Publication Data
US 2008/0145283 A1    Jun. 19, 2008

(51) Int. Cl.
*B01J 19/00* (2006.01)
(52) U.S. Cl.
USPC .......................................................... 422/224
(58) Field of Classification Search
USPC .......................................................... 422/224
See application file for complete search history.

(56) References Cited

U.S. PATENT DOCUMENTS

| | | | |
|---|---|---|---|
| 3,928,015 A | 12/1975 | Siegel et al. | |
| 4,313,918 A * | 2/1982 | Hendriks et al. | 423/310 |
| 5,488,142 A * | 1/1996 | Fall et al. | 560/227 |
| 5,578,278 A * | 11/1996 | Fall et al. | 422/234 |
| 5,904,906 A | 5/1999 | Vogel et al. | |
| 2002/0090325 A1* | 7/2002 | Hasegawa et al. | 422/188 |

FOREIGN PATENT DOCUMENTS

| | | |
|---|---|---|
| DE | 4126801 | 2/1993 |
| DE | 10001082 | 8/2001 |
| WO | 01/51429 | 7/2001 |

OTHER PUBLICATIONS

Patent Cooperation Treaty (PCT) Written Opinion of the International Searching Authority, International Application No. PCT/NO2005/000076, date of mailing Oct. 12, 2005.

* cited by examiner

*Primary Examiner* — Walter D Griffin
*Assistant Examiner* — Christopher Vandeusen
(74) *Attorney, Agent, or Firm* — Wenderoth, Lind & Ponack, L.L.P.

(57) ABSTRACT

A pipe reactor, especially for production of UAS, includes a tubular body and a reactor head, wherein the reactor head has a device for axial injection of acid, a device for injection of ammonia, a device for supply of urea and a reaction chamber, where acid and ammonia can react before coming into contact with urea.

20 Claims, 2 Drawing Sheets

PIPE REACTOR AND PLANT FOR MANUFACTURING OF ESPECIALLY UREA AMMONIUM SULPHATE

BACKGROUND OF THE INVENTION

I. Field of Invention

The invention concerns the design of a selective pipe reactor and a plant for producing various mixtures facing a common problem, how to preferentially react an acid and a base within a flow of a heat and/or acid sensitive component or mixture of components without decomposing them, or decomposing preferentially one of the components. A reactor that could be used for production of urea ammonium sulphate (UAS) is of special interest.

II. Description of Related Art

Pipe reactors for manufacturing of ammonium salts are for example known from U.S. Pat. No. 2,568,901, U.S. Pat. No. 2,755,176 and U.S. Pat. No. 5,904,906. These reactors make is possible to react an acid and a base, but these reactors cannot be used for a reaction where a third component is introduced.

Current commercial production of urea ammonium sulphate (UAS) is accomplished by physically mixing the two compounds by a process of adding pulverized solid ammonium sulphate to molten urea in a granulation step, such as a drum or a pan, as described in U.S. Pat. No. 3,785,796. This can be called the "solid route". It appears to be a rather simple process. It presents however some serious drawbacks both from an economical and from a process point of view.

Ammonium sulphate (AS) synthesis reaction in urea solution is described in U.S. Pat. No. 3,928,015 as a reaction in two steps. A bisulphate solution and ammonia react in the urea solution to produce essentially anhydrous AS in admixture with molten urea in a simple and inexpensive tank type or pipe type reactor.

Bisulphate corresponds to the product made by reacting one mole of sulphuric acid with one mole of ammonia, whereas ammonium sulphate corresponds to the product made by reacting one mole of sulphuric acid with two moles of ammonia. The first ammoniation of sulphuric acid (leading to bisulphate) is more exothermic than the second one.

Nevertheless, to perform in situ production of AS in urea solution is a challenge, since the acid promptly reacts with urea leading to urea losses. This significantly limits the advantages of any liquid route versus solid route for the production of UAS, if the losses are too high. Bisulphate is less aggressive to urea than sulphuric acid. According to U.S. Pat. No. 3,928,015, bisulphate is synthesized separately in order to minimize the urea decomposition. By this it does not take the full advantage of the heat released by the first ammoniation.

SUMMARY OF THE INVENTION

The object of the invention is to design a reactor that makes it possible to react an acid and a base within a flow of a heat and/or acid sensitive component without decomposing it. Another object is to design a reactor suitable for the production of UAS. A further object is to design a plant especially for UAS production.

These and other objects of the invention are obtained with the reactor as described below, and the invention is further defined and characterized by the accompanying patent claims.

BRIEF DESCRIPTION OF THE DRAWINGS

The invention will be further illustrated with reference to the figure, where.

DETAILED DESCRIPTION OF THE INVENTION

Figure 1:
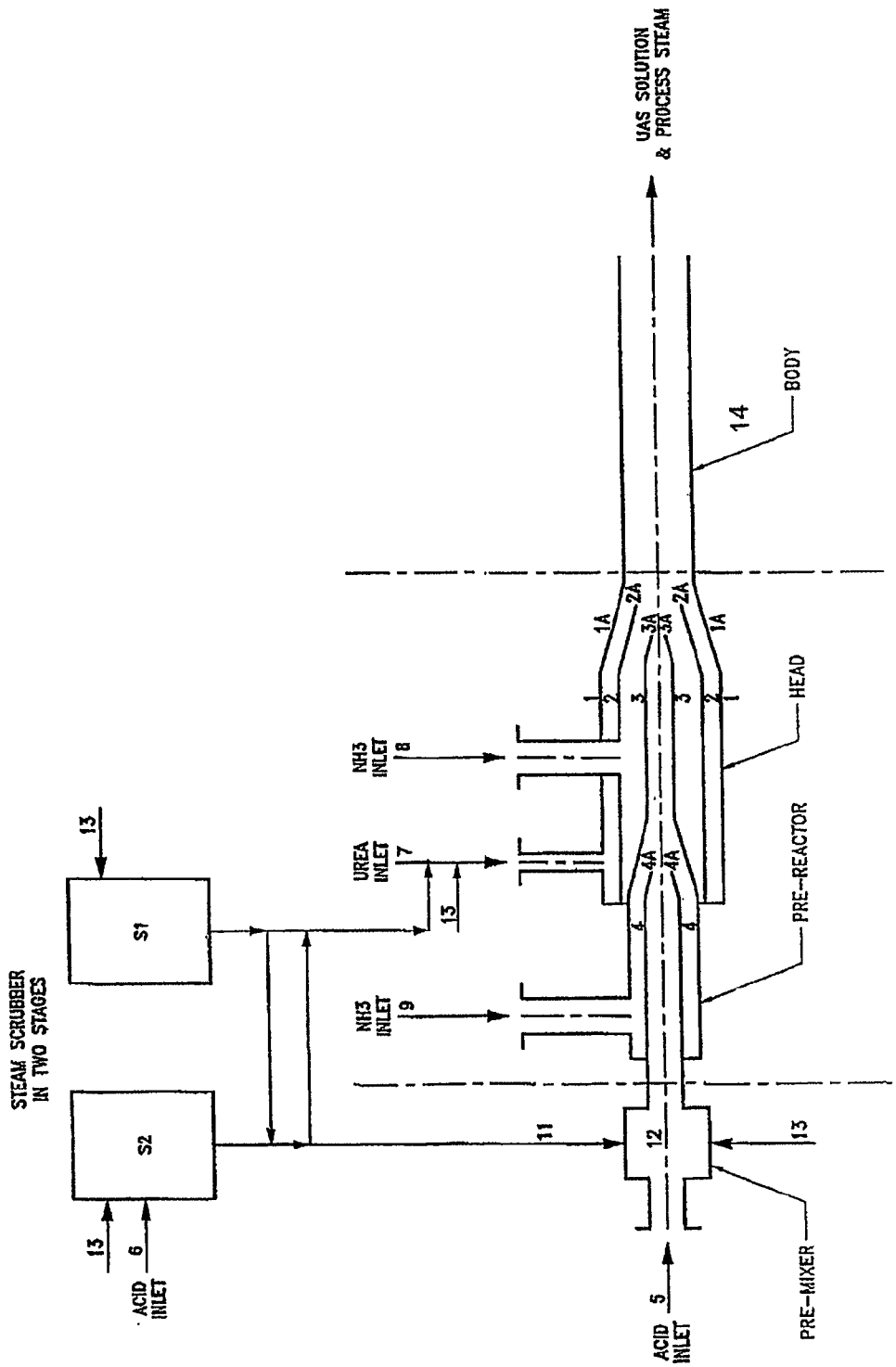
FIG. 1 shows a pipe reactor with pre-reactor, mixer and scrubbers.

The invention thus concerns a pipe reactor especially for production of UAS, comprising a tubular body and a reactor head, wherein the reactor head has means for axial injection of acid and means for injection of ammonia. The ammonia can be free and/or bound and/or mixed. Further it has means for supply of urea and a reaction chamber where acid and ammonia reactions are enhanced before coming into contact with urea. The pipe reactor could also be used for reacting another acid and base with other heat and/or acid sensitive component than urea.

It is preferred that a pre-reactor for pre-neutralizing the acid is arranged upstream of the reactor head. The pre-reactor could be a pipe reactor or a tank neutralizer.

Preferably the pre-reactor is part of the main pipe reactor and has an inlet for ammonia or other base. The ammonia can be free and/or bound and/or mixed. A mixer for dilution of acid could be arranged upstream of the reactor head. It is preferred that the reactor head has a convergent at its downstream end. The means for injection of ammonia or other base includes an inlet corresponding with an annular chamber surrounding the acid injector. The inlet is preferably tangential. The annular chamber has a cone or an open end in its downstream end. The means for supply of urea or other sensitive component comprises an inlet and an annular chamber surrounding the ammonia or other base injector.

The invention also concerns a plant for manufacturing of urea ammonium sulphate having a pipe reactor comprising a tubular body and a reactor head, wherein the reactor head has means for axial injection of acid, means for injection of ammonia, means for supply of urea and a reaction chamber where acid and ammonia can react before coming into contact with urea, a separator to separate steam produced from the UAS slurry and means for receiving the steam. The ammonia can be free and/or bound and/or mixed.

It is preferred that the reactor head is preceded by a pre-reactor, which has means for injection of ammonia, means for supply of acid and a reaction chamber. A mixer for dilution of the acid can be arranged upstream of the reactor head. The means for receiving the steam is preferably a scrubber that could be designed in two distinct stages. The scrubber preferably has means for recycling scrubbing solution to the urea inlet 7 and/or to the acid injector. A flash tank could follow the separator. The production of ammonium urea sulphate is preferably a tail end process of a urea plant.

The whole description presented hereunder is based on the urea ammonium sulphate (UAS) production, i.e. a mixture of urea and ammonium sulphate. Urea is sensitive both to heat and to the action of sulphuric acid. The ammonium sulphate is produced within urea solution by reacting sulphuric acid with ammonia and preserving, as much as possible, the urea component from prohibitive degradation.

However the same principles and equivalent concepts can be used for various other mixtures, wherever such an in situ synthesis is of more interest than a differentiated synthesis followed by a simple mixing step.

There are many advantages of in situ synthesis. A pipe reactor is very easy to operate, to start up and to shutdown. The heat of ammonium sulphate (AS) synthesis allows evaporation of water from the urea solution, thus evaporation step as well as utilities (steam especially) can be saved. The in situ synthesis produces very fine crystals of AS, especially suitable for the following granulation process and results in a more homogeneous product than obtained by the solid route. Finally, the implementation of in situ UAS synthesis in a total or partial recycle urea plant allows boosting the urea capacity significantly.

Process Description—UAS in situ production

In situ production of UAS is especially interesting as a tail end process of a urea plant.

The components and reactants are introduced into a pipe reactor. The flow exiting the reactor is discharged into a separator to separate steam produced from UAS slurry. The slurry can be directly or further flashed under vacuum to obtain the right water content for the following granulation process whereas the steam is acidly scrubbed before being e.g. condensed.

The scrubbing solution from the steam scrubber and the scrubbing solution from the granulation section are recycled to the inlet of the reaction section or used to some other purpose out of batteries limit (BL) (the limit of the process considered).

Four components are required in the pipe reactor, sulphuric acid (free or preneutralized as ammonium bisulfate), ammonia (free or linked as carbamate), urea and water (BL and/or scrubbing solution, in addition to the water contained in the raw materials, acid, ammonia, urea).

The sulphuric acid reacts with ammonia to form AS within the urea solution and the heat released by the synthesis evaporates the water into steam.

Some urea decomposes due to heat and acid present, and is either polymerised into biuret and other compounds, or hydrolyzed into carbon dioxide and ammonia. Such ammonia is neutralised by sulphuric acid and is therefore considered in the mass balance to obtain at the end the right ratio $N-NH_3$ to N-urea in the final product.

Water is added to the reactor to equilibrate the heat/water balance according to the amount of AS synthesized, the concentration of the urea solution fed to the pipe reactor, the wanted final water content and the amount of scrubbing solution to be recycled.

The pipe reactor discharges into a separator tank in order for the process steam to separate from the UAS solution.

To limit the high temperature, which enhances the unwanted decomposition of urea, as well as to achieve the right water content for the solution to be e.g. sprayed into a fluidised bed granulator (typically ~2 to 5% water), UAS solution is preferably flashed under vacuum.

This flash can be directly performed in the pipe reactor separator or in a second vessel, so called a flash tank. Use of such a flash tank avoids over designing the vacuum system (condenser and non condensables extraction) but requires doubling the process steam scrubber and the condensing system, in case the steam from the separator is to be condensed. Therefore, this configuration of a separator plus a flash tank has to be studied case by case, and is very advisable in the case of high plant capacity and consumption of urea plant off gas ammonia with involvement of a large amount of non condensables (such as $CO_2$ released by carbamate decomposition).

The steam produced in the reactor and separated in the separator contains mainly steam, but also some unreacted ammonia, carbon dioxide, some air, as well as droplets of UAS solution.

Various non condensables (NOx, SOx, . . . ) may be present in negligible amounts, depending on the quality of the entrants, not significantly created in the reactor.

The scrubber is a wet scrubber. The droplets of solution are caught within the scrubbing solution. The scrubber is partially acidified with sulphuric acid, to also stop the ammonia.

The scrubber is preferably designed in two distinct stages: in the first one, the droplets of urea are stopped by a quite neutral scrubbing solution, while the second step is acidic to catch the ammonia. It avoids enhancing urea degradation by strongly acidifying a urea containing scrubbing solution.

If the scrubber is designed in two stages, then the scrubbing solution from the second stage is preferably systematically recycled into the sulphuric acid line feeding the reactor, because this solution is nearly free of urea. Urea containing scrubbing solutions from the first stage should preferably not be recycled directly in the sulphuric acid to avoid a high rate of degradation of urea. This solution can be mixed with the scrubbing solution from the granulation section and sent to the urea solution feeding the pipe reactor. Alternatively it can be recycled to the urea concentration section, be exported or can be used as make up water in the scrubber of the granulation section.

Pipe Reactor Description

A pipe reactor is characterized by a strong and short turbulence to mix the reactants, let them get into contact and react immediately. The residence time usually doesn't need to be longer than 0.2 second in such equipment.

The design must allow the reactants to react selectively without decomposing urea, and to avoid that the acid or any other component may attack the material of the pipe reactor. Therefore the acid is introduced in the axis of the reactor and the initial turbulence improved so that the reaction starts immediately.

A fast reaction minimizes the risk that free acid droplets get into contact with the wall of the pipe reactor, corroding the steel, or creating hot points able to damage e.g. a Teflon lining.

In order to enhance the initial turbulence, the ammonia is preferably introduced as a gas. Its speed is high and tangential to the spray of acid, in order to improve its atomization and increase initial turbulence.

To limit urea losses, one must, whenever possible, soften the acid by enhancing the contact between acid and ammonia rather than with urea, pre-neutralize if possible the acid into ammonium bisulphate, that is much less aggressive to urea, keep the temperature as low as possible, i.e. keep the pressure drop as low as possible while maintaining a high turbulence degree.

To be efficient, a well-designed pipe reactor requires a high turbulence thus a pressure drop. If a reactor is under-loaded (means it has a low flow per reactor section unit), its efficiency decreases rapidly. In case of UAS, it means higher losses of urea and higher losses of ammonia to be caught in the scrubber.

On the contrary, if the capacity of a well-loaded (see here above) reactor is slightly increased, then its efficiency is improved and the pressure drop is simply higher.

However, this also results in a temperature increase in the reactor, which can be damageable for the material of the reactor as well as some components such as urea in the case of UAS in situ production.

A pipe reactor is therefore ideally designed for a given range of capacities, preferably 80 to 110% capacity.

A UAS pipe reactor comprises several parts dependent on the process and the raw materials to be used. It will be further described with reference to FIG. 1.

FIG. 1 shows a pipe reactor comprising a pre-mixer, a pre-reactor, a reactor head and a reactor body. The reactor head and reactor body is compulsory in all variations of the reactor, while the use of a pre-mixer and pre-reactor will be dependent on the process conditions.

The head 1 of the reactor comprises a reaction chamber. This is the zone comprised between the end of the acid cone 3A and the end of the ammonia cone 2A, where ammonia and acid get into contact and react. The head is tubular with a convergent 1A at its downstream end. It has an axial acid injector 3, 3A. Ammonia is introduced tangentially through inlet 8 to an ammonia injector 2 forming a first annular chamber surrounding the acid injector. The ammonia injector has a cone 2A at its downstream end. Urea is supplied through an inlet 7 to a second annular chamber surrounding the ammonia injector. The body 14 of the reactor is the straight length of the reactor downstream of the convergent 1A.

In some cases, as explained hereinafter, acid can be partially neutralized by some ammonia before any introduction of urea, in a separate reactor called a pre-reactor. The pre-reactor is placed upstream of the reactor head 1 and has an inlet 9 for ammonia to an annular chamber surrounding the axial acid supply where the acid injector 4 has a conical end 4A.

The pre-mixer 12 is placed upstream the pre-reactor and can be used on the sulphuric acid line to dilute the acid 5 with water 13 or with scrubbing solution 11.

FIG. 1 also illustrates the double stage scrubbing where the first stage S1 is catching urea and the second stage S2 is acidified 6 to catch ammonia.

Optimizing Design of UAS Pipe Reactor

The design of a UAS pipe reactor can be optimized according to the ammonia balance, respecting the water balance of the plant and optimizing the energy balance.

Ammonia Balance:

Two cases have to be considered for the design of the pipe reactor:
CASE A: ammonia has to be partially or totally fed to the process in addition to the urea solution in order to achieve the required UAS grade
CASE B: urea solution contains sufficient amount of ammonia as carbamate or as free ammonia to achieve the required UAS grade.

Water Balance

The water balance is mainly function of:
the water content in the urea solution fed to the pipe reactor
the heat of reaction
the ratio between AS synthesized in the reactor and AS synthesized in the steam scrubber (see hereunder)
the vacuum applied in the flash tank
the recycling of scrubbing solutions Energy Balance The energy released in the pipe reactor by the synthesis allows evaporation of more water, that makes it possible to work with a less concentrated urea solution fed to the pipe reactor, which is favourable from an energy point of view.

On the contrary, the energy, released by reaction in the steam scrubber, is not contributing to the concentration of the UAS solution, but requires additional make up water to the scrubber.

The more AS is synthesized in the reactor rather than in the scrubber, the better the energy balance is as well as the water balance.

CASE A—Ammonia is Supplied Separately from Urea, Fully or Partially

When ammonia is being partially or fully supplied separately, it is possible to enhance the contact of acid with ammonia before it gets in contact with urea.

The excess in the molar ratio ammonia to sulphuric acid in the pipe reactor is typically fixed at 2%, mainly to compensate the flows variations due to the fluctuations of the control valves.

Gaseous ammonia as feed the reactor is more preferred than liquid ammonia. The volumetric flow is much higher, thus the initial turbulence and the start of the reaction.

Therefore, if ammonia is available at batteries limits under liquid form, it is preferably evaporated in a heat exchanger used to, e.g., condition some air in the plant, typically in the end product cooling section. Ammonia can then be preheated, using, for example, the process steam produced in the pipe reactor.

Ammonia can also be supplied within a mixture of gases, typically a mixture of ammonia, carbon dioxide and water steam coming from the stripping of carbamate in the upstream urea process or ammonia off gases. In such case, water steam and carbon dioxide acts as inert compounds. They improve the turbulence in the reactor, thus slightly its efficiency.

Case A can be divided itself into two cases, detailed later on:
Either the water brought by the urea solution and by concentrated urea-containing scrubbing solutions, allows to absorb most of the heat released by the in situ synthesis (case A1)
Or on the contrary such water is not sufficient (case A2) and extra water has to be added.

Case A2 may especially occur for high ratios of ammonium sulphate (AS) to urea, and in such case a bisulphate pre reactor is preferably added, while not suitable in case A1.

CASE B—Ammonia is Supplied within Urea Solution, as Carbamate and Ammonia

Ammonia source being fully mixed in the urea solution, the sulphuric acid can meet both urea or ammonia source to react. The risk of urea decomposition is high. An alkaline medium is favourable to prevent urea from decomposition and the operating conditions are fixed accordingly: the excess of ammonia in the molar ratio is higher than in case A (typically 5 to 20%).

This alkalinity, combined with the design of the reactor itself, reduces the urea losses. In such case the scrubbing solution from the steam scrubber (from the second stage if urea and ammonia are scrubbed separately) is preferably recycled into the sulphuric acid in line, equipped, e.g., with a static mixer to let the mixture more homogeneous and avoid hot points. This allows to introduce into the UAS pipe reactor a softer acid, since on the one hand it has been diluted with some water, second the ammonium sulphate from the scrubbing solution is converted into ammonium bisulphate, less aggressive to the urea than sulphuric acid itself.

However more acid has to be fed to the steam scrubber, which becomes as a second reactor.

Description of the Reactors

TABLE 1

|  | Case A1 | Case A2 | Case B |
| --- | --- | --- | --- |
| mixer | recommended | recommended | strongly recommended |
| pre-reactor | Not required | Strongly recommended | Not required |
| head | yes | yes | yes |
| body | yes | yes | yes |

Head and body of the reactor are common to the different cases whereas the first part of the reactor varies.

Body of the Reactor

The design of the body is the same both in case A and B. It is a straight piece of tube, defined by its diameter and its length. The length of the pipe reactor is designed to give enough time for the reactants to have a chance to meet each other and react, whereas the diameter of the reactor is equivalent to a certain degree of turbulence, thus mixing and improving the efficiency.

In the case of UAS, the heat flux (considering the heat released by the chemical reaction) must be more than 5 000 kcal/h/cm$^2$ and less than 150 000 kcal/h/cm$^2$, preferably between 25 000 and 90 000 kcal/h/cm$^2$, and residence time less than 1 s, preferably less than 0.2 s.

If the heat flux is too low, then the contact between reactants is poor, ammonia is lost and has to be neutralized in a steam scrubber, while acid remaining in urea solution degrades some urea.

If the residence time is too long, then two cases have to be considered, according to the load of the reactor:
  If the residence time is too long because the reactor is under loaded, then urea is decomposed due to poor turbulence as described here above,
  if the reactor is well loaded but it is too long, extra residence time has a negative effect, as it creates unnecessarily pressure drop, thus higher temperature in the first part of the reactor, leading to urea losses.

To keep temperature in the reactor at a reasonable level while allowing enough pressure drop for efficient mixing, the pressure drop must be higher than 0.5 bar, preferably higher than 1 bar, and back pressure to the reactor, for example the ammonia pressure after its control valve just before entering the reactor, must preferably remain less than 10 bars, preferably less than 5 bars.

The Head of the UAS Reactor

The design of the head of the UAS reactor has to answer the following issues:

Urea is sensitive to decomposition, but urea carries most of the water that allows control of the temperature. In some cases the urea carries also the basis to be neutralized, e.g. a urea-carbamate solution.

The head therefore has to be designed to enhance the contact between the reactants rather than between urea and unreacted acid, and in any way it is advisable to soften the acid before the contact with urea. Moreover, contact of acid droplets with the wall of the reactor have to be avoided.

For all those reasons, the head of the UAS pipe reactor must be designed to enhance immediate contact and turbulence, to reach an intimate and neutralized mixture. Any acid remaining un-neutralized in a vein of free acid or any droplet of free acid, has a negative effect on the pipe reactor efficiency and urea decomposition. The initial turbulence is linked to the way of introducing the reactants, and is further improved by the heat of the reaction, causing water evaporation, thus further mixing and turbulence.

In both cases A and B, the principle of the reactor head is similar: centrally the acid, directly or from the pre mixer or through the pre reactor, around it as a first annulus may be a source of ammonia when applicable, and as an external annular flow, the urea containing flow.

Acid is introduced in the axis of the body of the reactor. It is injected centrally by an injector 4; 4A with preferably a nozzle 4A, at its end, in case of a pre reactor, or directly through injector 3/3A with preferably a nozzle 3A at its end. This is typically a simple cone, to spray the flow and therefore improve the contact area between the reactants, thus the speed of reaction.

The acid can be sulphuric acid, or diluted sulphuric acid, or pre-neutralized sulphuric acid, i.e. a mixture of sulphuric acid, ammonium bisulphate, etc. It is normally liquid but may contain some vapours, for example if a pre-reactor as described here after.

Moreover, the acid has to be softened as much as possible before entering the head of the UAS reactor. The best way to soften the acid before contacting urea would be to fully neutralize it into ammonium sulphate. However full ammoniation of the sulphuric acid before contacting the urea is not possible.

The reasons are:
  First, an ammonium sulphate solution needs a high water content to be fluid, thus ammonium sulphate synthesis followed by mixing with urea doesn't allow to achieve the water balance, to reach the right water content at the outlet of the reactor.
  Second because the synthesis of ammonium sulphate is strongly exothermic water, to absorb such heat of the reaction, allowing the temperature to be maintained under reasonable limits, is generally contained mostly in the urea solution. Synthesis and mixing have therefore to be performed nearly simultaneously, and ammonium sulphate (AS) cannot be fully synthesized yet when the reactants flow enter urea.
  Third, the ammonia to be neutralized (free ammonia and/or carbamate) is sometimes already contained in the urea flow, meaning that ammonium sulphate has to be synthesized intimately within the urea flow and cannot be synthesized prior contacting urea.

Reactor Design and Principle for Case A1

In this case, the first annulus around the central acid injector [zone between 2 and 3] is fed with the ammonia flow 8, e.g. gaseous ammonia or carbamate solution.

Thanks to the design of the ammonia injector 2; 2A, the acid is sprayed into an area free of urea in the reaction chamber [between 3A and 2A]. The design of this chamber gives to the reactor a double cone appearance: a first cone 3A (or a nozzle) on the acid, a second cone 2A on the ammonia, plus a convergent 1A on the urea.

A large amount of heat is released in that reaction chamber. It has therefore to be quite open so that the reacting droplets are carried out of the chamber into the urea flow, which absorbs the heat. In a way the acid meets a curtain of ammonia before contact with urea.

The contact point with urea is especially turbulent [zone between 1A and 2A] to dissipate the heat and homogeneously mix the products; thus the reactive mixture is preferably sprayed out of the reaction chamber in the convergent 1A to the body of the reactor 14, where the different fluids converge, enhancing the turbulence.

The converging angle 1A is typical from hydrodynamic physics, preferably an opening angle between 30 and 90° to avoid local back mixing, but to improve the circulation into the body of the reactor.

The outlet diameter of the cone 2A is preferably smaller or equal to the diameter of the body of the reactor 1A, in order to avoid any hot spots on the wall of the reactor, especially on the converging section. However, the cone 2A can also be fully open, i.e. be replaced by a straight portion of injector 2.

The design of the reaction chamber, 2A/3A, can be strongly inspired from the design of air pneumatic nozzles.

The un-reacted acid at this stage reacts along the body of the reactor 14, mainly with ammonia, also with some urea that is decomposed.

The scrubbing solutions are recycled wherever convenient. If they contain urea, they are preferably recycled into urea flow. If they do not contain urea or a small amount of urea only, for example if a second stage of process steam scrubbing exists [S2], they are preferably recycled into sulphuric acid in line.

Case A2

In case the synthesis of ammonium sulphate releases more heat than the urea flow can accept due to its water content, then some extra water has to be added in addition to the one contained in the urea solution and it becomes interesting to use a pre-reactor.

This is for example the case for the synthesis of a mixture containing 50% of AS and 50% urea and using a 70% urea solution as raw material.

Such a pre-reactor can be either a tank neutralizer or a pipe reactor.

If the reaction is performed in a separate vessel designed as a neutralizer, it may preferably be maintained under certain pressure which, allied with gravity, allows feeding the reactor without using any pump on such a corrosive medium. Such a system of a separate pre neutralizer presents the advantage of getting some pressurized pressure steam if required, but requires more investment than the pipe reactor option.

As herein described, the pre-reactor can be simpler, designed in the same pipe reactor that the UAS reactor, being built as an extra length to the UAS pipe reactor itself, prior to the urea injection, zone 1A/2A.

This reaction is especially fast, and the pre-reactor can resume itself to a kind of reactive nozzle, zone 3A/4A.

Water 13 is first added into the ammonia through inlet 9 or into the acid 5. If added to the acid, the e.g. PTFE coated pipe is advantageously equipped with a static mixer 12 to avoid any hot point which may damage the Teflon. The mixture enters the nozzle to be sprayed within an axial or preferably tangential flow of ammonia by the inlet 9, just into the acid injector 3/3A.

Such a pre-reactor configuration may help improving the overall economy of the urea complex. A urea plant produces water, according to the stoechiometry:

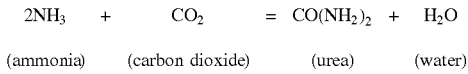

$$2NH_3 + CO_2 = CO(NH_2)_2 + H_2O$$

(ammonia)    (carbon dioxide)    (urea)    (water)

Therefore water is available on site and additional water to the reactor can be interestingly some weak carbamate solution or N containing effluents from the urea plant, that require costly treatment before discharge to the environment, such as thermal hydrolysis.

Case B

This is typically the case of a urea-carbamate solution available in any urea complex.

The operating conditions are chosen to work with a large alkaline excess in the reactor and to catch large amount of the ammonia in the acidified steam scrubber. Therefore the steam scrubbing solution contains a lot of ammonium sulphate. Typically 5 to 20% of the acid is added into the steam scrubber.

In this case, it is strongly recommended to work with a double stage scrubber [S1; S2]: a first stage [S1] to catch the urea droplets, and a second one [S2] to treat specifically the ammonia.

Thus the scrubbing solution 11 of the second stage, nearly free of urea, is directly recycled into the sulphuric acid line to soften it without degrading scrubbed urea. The acid line is preferably equipped with a static mixer 12 to soften by pre-reacting. 10% to ~50% of the sulphuric acid is therefore transformed into bisulphate already before contacting any urea, which allows globally reasonable degradation rate of urea to be achieved.

The scrubbing solution from the dry part together with the scrubbing solution from the first stage steam scrubber 10 are typically recycled into the first annulus of the UAS reactor, designed as in case A, or directly within the urea flow 7.

Design of the Separator

The pipe reactor discharges into a separator (not shown) a three-phase mixture: liquid (urea, water, dissolved ammonium sulphate, . . . ), gas (steam produced owing to the heat of reaction) and even solid (oversaturated AS crystals). The aim of the separator is to separate the solution/slurry of UAS and the process steam. Due to the potential presence of crystals and to the high speed in the reactor, the separator has to be designed in order to resist abrasion.

The design of the separator will depend on the lay out, especially in the case of a revamped plant. The reactor can be installed horizontally or vertically or in any intermediate position. Several possibilities for the separator can be foreseen in respect to efficiency of separation and resistance to abrasion.

Preferably the separator is a vessel with an internal skirt. Inlet of steam is on the top of the vessel and tangentially in order to get a cyclonic effect improving the separation efficiency.

In its lower part, it has a conical or dished shape, preferably with a reduced diameter in order to allow a more accurate level control with a reduced residence time. An anti-vortex device is preferably installed for the same level control purpose.

In the upper part of the separator, a droplet separator device (knitted mesh, cap trays type, candle or packing type for example) may advantageously be installed to separate most of the remaining droplets.

In such a case, a water or condensates sprayer is preferably fitted in order to clean, from time to time, the droplet separator when its pressure drop increases, due to scaling, crystallization, and/or progressive plugging.

Steam Scrubber

The steam produced in the pipe reactor contains some un-reacted ammonia as well as some droplets of UAS solution, which haven't been separated in the separator.

Therefore this steam is scrubbed into an acidified scrubber. It can be a packed or trays column, a Venturi scrubber, or combination of such devices in order to achieve the required specifications.

This scrubber moreover has the advantage of saturating the process steam, improving the overall efficiency of the condenser. The scrubber can be either an independent vessel, a succession of independent elements fulfilling successive scrubbing stages to achieve the same result, or even incorporated at the top of the pipe reactor separator as single equipment.

The scrubber is preferably designed in two stages: in the first one the droplets of urea/UAS are stopped by a rather neutral scrubbing solution, while the second step is kept acidic to catch the ammonia. It avoids enhancing urea degradation by strongly acidifying a urea containing scrubbing solution.

The invention will be further illustrated with reference to the following examples:

EXAMPLES

Example 1

Illustration of case A1

Figure 2:
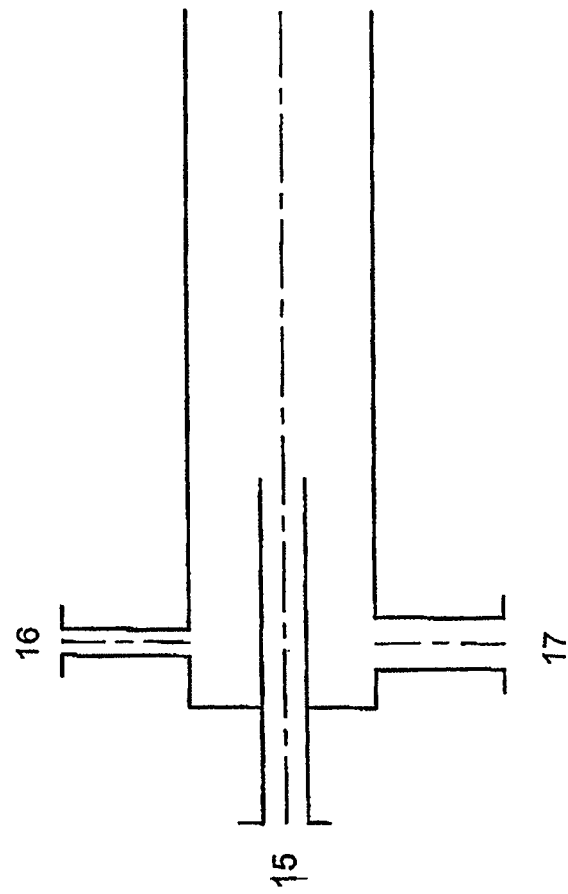
FIG. 2 shows a standard pipe cross reactor.

Experiments have been conducted in a small pilot plant scale. First, in a typical standard pipe cross reactor as shown in FIG. 2, fed with acid in the axis 15 of the reactor, 78% urea solution free of carbamate by inlet 16 and gaseous ammonia by the inlet 17.

Second, in the reactor according to this invention, with a reactor corresponding to the case A1. Acid is injected in the axis, urea solution by inlet 7 and gaseous ammonia by inlet 8. The target was to produce UAS containing 77% of urea and 23% of AS. The ammonia was fed with excess in the molar ratio of 2%.

Flash was performed under vacuum at 0.5 bar abs at a temperature of about 135° C., the water content of the solution exiting the reactor was around 5%. Scrubbing solution was not recycled during this experiment.

The conditions and results are indicated hereafter in Table 2:

TABLE 2

|  | With pipe cross head | With invented reactor |
|---|---|---|
| Urea to the reactor kg/h (expressed as 100% urea) | 500 | 500 |
| Urea exiting the reactor (in UAS and condensates) kg/h | 452 | 490 |
| NH3 to the reactor (kg/h) | 39 | 39 |
| Sulphuric acid to the reactor (kg/h) | 111 | 111 |
| Ammonium sulphate in the produced UAS (kg/h) | 149 | 149 |
| Biuret increase | 0.5% | 0.4% |
| urea degraded (%) (by hydrolysis or biuret formation) | 9.6% | 2.1% |

Example 2

Illustration of case A2

Experiments have been performed to produce a grade of UAS 65/35 w/w by using a 78% urea solution. Additional water was therefore required to absorb the heat of reaction. In the first experiment, water was introduced by diluting the urea solution 7; 13, while in the second one, advantages of a pre-reactor have been studied, with one quarter of the ammonia amount fed by inlet 9, three quarters of ammonia fed by inlet 8 and extra water 13 added in the acid 5 using a pre mixer 12.

Flash under 0.5 bars abs was performed in a separate vessel next to the pipe reactor separator. The results and conditions are illustrated in Table 3:

TABLE 3

|  | Without pre reactor | With pre reactor |
|---|---|---|
| Urea to the reactor kg/h (expressed as 100% urea) | 500 | 500 |
| Urea exiting the reactor (in UAS and condensates) kg/h | 483 | 488 |
| NH3 to the reactor (kg/h) | 71 | 71 |
| Sulphuric acid to the reactor (kg/h) | 200 | 200 |
| Ammonium sulphate in the produced UAS (kg/h) | 269 | 269 |
| Biuret increase | 0.5% | 0.5% |
| urea degraded (%) (by hydrolysis or biuret formation) | 3.4% | 2.4% |

Example 3

Illustration of Case B

Trials with urea-carbamate have been performed with an excess of ammonia in the molar ratio of 2% and with an excess of ammonia in the molar ratio of 10 and 20% respectively. Urea melt with a concentration of 99.5% was mixed in line with a suspension of ammonium bicarbonate and gaseous ammonia in order to simulate a urea-carbamate solution. The target was 35% AS in the UAS.

The recycling of scrubbing solution corresponding to a second stage scrubber has been simulated by an additional flow of ammonium sulphate solution at a concentration of 30% into a premixer. This flow of AS corresponds to the neutralization of the excess of ammonia fed to the reactor, but excluding the ammonia released by urea degradation.

An adjusting flow of water was added into the urea solution in order to achieve a similar water content of nearly 5% in the UAS solution at the outlet of the flash tank. The results and conditions are illustrated in Table 4:

TABLE 4

|  | 2% excess $NH_3$ | 10% excess $NH_3$ | 20% excess $NH_3$ |
|---|---|---|---|
| Urea to the reactor kg/h (expressed as 100% urea) | 500 | 500 | 500 |
| Urea exiting the reactor (in UAS and condensates) kg/h | 446 | 459 | 489 |
| Ammonium bicarbonate into urea kg/h | 50 | 50 | 50 |
| $NH_3$ into urea (kg/h) | 59 | 59 | 59 |
| Sulphuric acid to the reactor (kg/h) as $H_2SO_4$ 100% | 196 | 180 | 160 |
| AS into premixer (kg/h) expressed as AS100% | 5 | 27 | 54 |
| Ammonium sulphate in the produced UAS (kg/h) | 269 | 269 | 269 |
| Biuret increase % | 0.5% | 0.4% | 0.5% |
| Urea degraded (%) (by hydrolysis or biuret formation) | 10.8% | 8.2% | 2.3% |

The invention claimed is:

1. A pipe reactor, comprising:
   a tubular body; and
   a tubular reactor head comprising a downstream end, an acid injector for axial injection of acid, a base injector for injection of a base, an annular chamber surrounding said base injector, and an inlet for supplying at least one of a heat sensitive component and an acid sensitive component, said tubular reactor being conically convergent at said downstream end,
   wherein said base injector forms an annular chamber surrounding said acid injector, and includes an inlet to said annular chamber surrounding said acid injector, and
   wherein said base injector has an end and said acid injector has an end, and a reaction chamber is formed between said end of said base injector and said end of said acid injector.

2. A pipe reactor according to claim 1, wherein said acid injector is configured to inject one of sulphuric acid and pre-neutralized sulphuric acid, said base injector is configured to inject ammonium, and said inlet for supplying the at least one of the heat sensitive component and the acid sensitive component is a urea inlet, such that said pipe reactor is configured to produce urea ammonium sulphate.

3. A pipe reactor according to claim 1, wherein a pre-reactor for pre-neutralizing the acid is arranged upstream of said reactor head.

4. A pipe reactor according to claim 3, wherein said pre-reactor is one of a pipe reactor and a tank neutralizer.

5. A pipe reactor according to claim 4, wherein said pre-reactor is part of a main pipe reactor.

6. A pipe reactor according to claim 1, wherein a mixer for dilution of the acid is arranged upstream of said reactor head.

7. A pipe reactor according to claim 1, wherein said end of said base injector has a cone or an open end and is disposed so as to be a downstream end of said base injector.

8. A plant for manufacturing urea ammonium sulphate, said plant comprising:
- a pipe reactor comprising a tubular body and a tubular reactor head, the tubular reactor head comprising a downstream end, an acid injector for axial injection of sulphuric acid, a base injector for injection of ammonia, an annular chamber surrounding said base injector, an inlet for supplying at least one of a heat sensitive component and an acid sensitive component, and a conical convergent at said downstream end;
- a separator configured to separate steam from a urea ammonium sulphate slurry; and
- a unit configured to receive the steam,
- wherein said base injector forms an annular chamber surrounding said acid injector, and includes an inlet to said annular chamber surrounding said acid injector, and
- wherein said base injector has an end and said acid injector has an end, and a reaction chamber is formed between said end of said base injector and said end of said acid injector.

9. A plant according to claim 8, wherein said reactor head is preceded by a pre-reactor, said pre-reactor having an inlet for injection of ammonia, a unit configured to supply acid, and a reaction chamber.

10. A plant according to claim 8, wherein a mixer for dilution of the acid is arranged upstream of said reactor head.

11. A plant according to claim 8, wherein said unit configured to receive the steam is a scrubber.

12. A plant according to claim 11, wherein said scrubber has two separate stages.

13. A plant according to claim 11, wherein said scrubber has a unit configured to recycle scrubbing solution to at least one of said inlet for supplying at least one of the heat sensitive component and the acid sensitive component and said acid injector.

14. A plant according to claim 8, wherein said separator is followed by a flash tank.

15. A plant according to claim 8, wherein said plant is configured to produce ammonium urea sulphate as a tail end process of a urea plant.

16. A pipe reactor according to claim 2, wherein a pre-reactor for pre-neutralizing the acid is arranged upstream of said reactor head.

17. Pipe reactor according to claim 2, wherein a mixer for dilution of the acid is arranged upstream of said reactor head.

18. A plant according to claim 12, wherein said scrubber has a unit configured to recycle scrubbing solution to at least one of said inlet for supplying at least one of the heat sensitive component and the acid sensitive component and said acid injector.

19. A pipe reactor according to claim 1, wherein said inlet for supplying at least one of the heat sensitive component and the acid sensitive component is connected to said annular chamber surrounding said base injector.

20. A plant reactor according to claim 8, wherein said inlet for supplying at least one of the heat sensitive component and the acid sensitive component is connected to said annular chamber surrounding said base injector.

* * * * *